United States Patent

Anderson

[15] 3,648,353
[45] Mar. 14, 1972

[54] METHOD OF MAKING AUTOMOTIVE TRIM

[72] Inventor: Ray B. Anderson, Attleboro, Mass.
[73] Assignee: Texas Instruments Incorporated, Dallas, Tex.
[22] Filed: Jan. 2, 1970
[21] Appl. No.: 478

[52] U.S. Cl..............................29/470.1, 29/472.3, 29/487, 29/497.5, 29/504, 29/191.6, 29/196.1
[51] Int. Cl.................................................B23k 21/00
[58] Field of Search.................29/470.1, 472.3, 497.5, 504, 29/191.6, 196.1, 487

[56] References Cited

UNITED STATES PATENTS

| | | | |
|---|---|---|---|
| 1,984,134 | 12/1934 | Himmel et al. | 29/191.6 |
| 2,484,118 | 10/1949 | Reynolds | 29/196.2 X |
| 3,536,459 | 10/1970 | Bates | 29/191.6 |
| 3,556,745 | 1/1971 | Zaremski | 29/191.6 X |
| 3,559,276 | 2/1971 | Anderson | 29/497.5 X |
| 2,691,815 | 10/1954 | Boessenkool et al. | 29/470.1 UX |
| 2,704,883 | 3/1955 | Hamilton et al. | 29/472.3 X |
| 2,937,435 | 5/1960 | Brenner et al. | 29/504 X |
| 2,965,963 | 12/1960 | Boty et al. | 29/497.5 X |
| 3,078,563 | 2/1963 | Gould et al. | 29/497.5 X |
| 3,393,445 | 7/1968 | Ulam | 29/504 X |
| 3,352,005 | 11/1967 | Avellone | 29/504 X |
| 3,381,365 | 5/1968 | Winter | 29/472.3 |
| 3,387,357 | 6/1968 | Sendzimir | 29/497.5 X |

Primary Examiner—John F. Campbell
Assistant Examiner—Ronald J. Shore
Attorney—Harold Levine, Edward J. Connors, Jr., John A. Haug, James P. McAndrews and Gerald B. Epstein

[57] ABSTRACT

An automotive trim material to be detachably mounted on a painted steel automotive body by means of clips secured to the body is shown to comprise a composite metal laminate material having an outer layer of stainless steel disposed exteriorly of the trim configuration, an intermediate layer of mild steel material, and an opposite outer surface layer of aluminum material, said laminate layer materials being metallurgically bonded together in the solid phase, the stainless steel layer being in scratch-resistant, cold-worked condition, the mild steel layer being in easily formed, annealed condition, and the interface between the mild steel and the aluminum layers being substantially free of embrittling aluminum-iron intermetallic compounds. The composite metal laminate material is formed by roll-squeezing layers of selected metal materials together with reduction in the thicknesses thereof at a temperature below the temperature at which a liquid phase of the layer materials is formed and below a temperature at which intermetallic compounds of aluminum-iron are formed, thereby metallurgically bonding the layers together and cold-working the layer materials. The resulting bonded composite material is then heated to a selected temperature which is above the recrystallization temperature of said mild steel material, which is below the recrystallization temperature of said stainless steel material, and which is below the temperature at which any substantial amount of aluminum-iron intermetallic compound is formed at the bonded interface between the mild steel and aluminum materials of the laminate.

4 Claims, 2 Drawing Figures

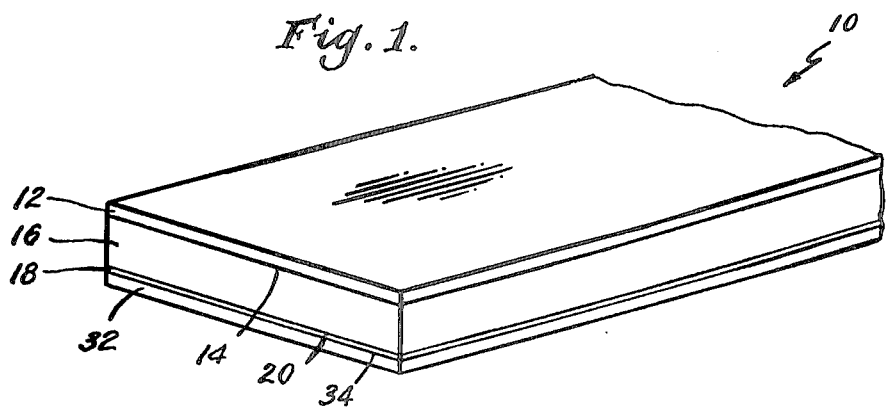
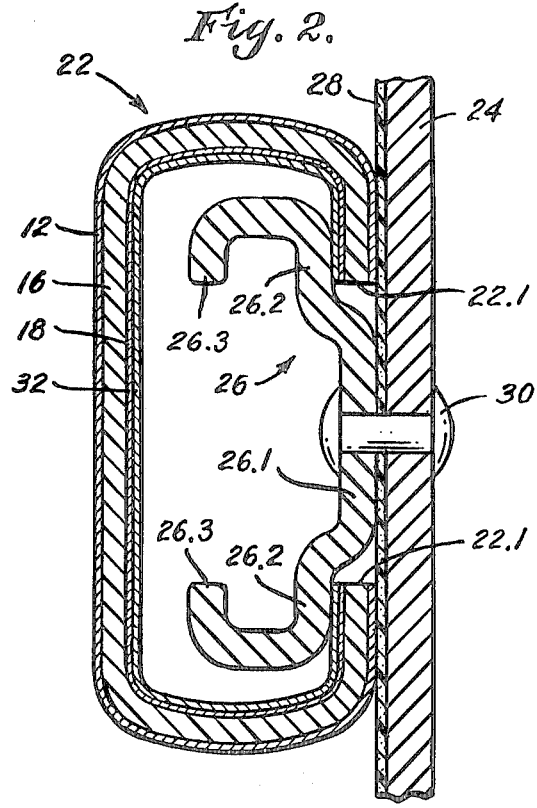
Inventor,
Ray B. Anderson,

METHOD OF MAKING AUTOMOTIVE TRIM

A material proposed for use as automotive trim and the like comprises a composite metal laminate material having an outer layer of stainless steel, an intermediate layer of mild steel, and an opposite outer layer of aluminum material, the layers of the composite being metallurgically bonded together along the interfacial surfaces between the metal layers. When this composite material is formed into a selected trim configuration with the stainless steel layer of the composite disposed on the exterior surface of the trim configuration, the stainless steel material provides the trim with a corrosion-resistant surface of attractive color and luster. The intermediate mild steel layer of the composite material provides the trim with adequate strength at low cost, and the opposite outer surface layer of aluminum material galvanically protects the mild steel layer of the trim, as well as the steel of the automotive body to which the trim is attached, by serving as a preferentially corrosive or sacrificial layer of material. That is, when stainless steel trim material is mounted on an automotive body and is exposed to rain, road salts and the like, these extraneous materials tend to induce an electrolytic action between the stainless steel trim material and the steel of the automotive body leading to rapid corrosion and rusting of the automotive body. When the trim material incorporates a mild steel intermediate layer as above described, this electrolytic action also tends to cause corrosion of the mild steel layer of the laminate material resulting in further rust staining in the area of the automotive trim. However, where the trim material further incorporates an outer layer of aluminum material as above described, the aluminum layer is corroded in preference to the steel of the automotive body or the steel of the intermediate layer of the composite material, this corrosion resulting at worst in production of a white dust or powder which is easily removed from the trim area of the automotive body.

In order to enhance the usefulness of such a composite laminate material, particularly for use in forming relatively complex trim configurations, it would be desirable to achieve maximum formability in the composite material. In addition it would also be desirable to enhance the scratch resistance of the stainless steel layer of the laminate, which stainless steel layer ultimately forms the exterior surface of such trim configurations.

It is an object of this invention to provide a novel and improved composite laminate material which is particularly suited for making automotive trim and the like; to provide automotive trim and the like in which the exterior surface of the trim has enhanced scratch resistance; to provide such composite materials which are easily formed into relatively complex trim configurations; and to provide such composite material and trim configurations which are of inexpensive construction. It is also an object of this invention to provide novel and improved methods for making such composite materials for use in making such trim configurations.

Other objects, advantages and details of the composite material, trim and methods of composite material manufacture as provided by this invention appear in the following detailed description of preferred embodiments of the invention, the detailed description referring to the drawings in which:

FIG. 1 is a perspective view of the composite metal laminate material of this invention; and FIG. 2 is a partial section view through an automotive body and the trim material of this invention, the trim material being shown attached to the automotive body.

Referring to the drawings, 10 in FIG. 1 indicates the novel and improved composite metal laminate material of this invention which is utilized in making automotive trim and the like in accordance with this invention. As shown, the laminate material incorporates a relatively thin outer or surface layer 12 formed of stainless steel which is metallurgically bonded along an interfacial surface 14 to a relatively much thicker intermediate layer 16 of a mild steel material. The laminate material 10 further incorporates an opposite outer layer of aluminum material, this opposite outer layer preferably being formed of a first layer 18 of one aluminum material metallurgically bonded to the intermediate layer 16 along the interfacial surface 20 and a second layer 32 of another aluminum material metallurgically bonded to the layer 18 along the interfacial surface 34 as shown in FIG. 1.

In the preferred embodiment of this invention, the stainless steel layer of the laminate material 10 embodies a chromium steel alloy such as is commercially available under the designation SAE 434 Stainless Steel, this material having a nominal composition, by weight, of from 0.10 to 0.14 percent carbon, from 14.0 to 18.0 percent chromium, and the balance iron. However, other stainless steel materials, including nickel-bearing stainless steels, having a recrystallization temperature above about 1,100° F. can also be embodied in the laminate layer 12 within the scope of this invention. It is also within the scope of this invention to utilize more than one layer of stainless steel material in the laminate layer 12, these plural stainless steel layers being metallurgically bonded together to serve as the single composite layer 12.

In the preferred embodiment of this invention, the intermediate laminate layer 16 of this invention preferably embodies a mild steel material which is commercially available under the designation SAE 1006 Capped Steel, this material having a composition, by weight, of 0.08 percent (maximum) carbon, 0.25–0.40 percent manganese, 0.040 percent (maximum) phosphorous, 0.050 percent (maximum) silicon, about 0.015 percent (maximum) aluminum, about 0.04 percent (maximum) copper, not more than about 0.39 percent of other ingredients present as impurities, and the balance iron. Desirably this mild steel material has an uncombined nitrogen content up to about 0.009 percent by weight, this nitrogen content replacing part of the iron content of the steel material. Preferably, also, the material layer 16 embodied in the laminate 10 preferably has a minimum thickness of at least about 0.0014 inch. It should be understood however that other mild steel materials having recrystallization temperatures not higher than about 1,050° F. can also be utilized in the laminate layer 16 within the scope of this invention. It is also within the scope of this invention to utilize a plurality of mild steel layers which are metallurgically bonded together to serve as the single intermediate layer 16 of the composite material 10. For example, in a practical embodiment of this invention, a layer of SAE 1006 Capped Steel as above described is metallurgically bonded to another mild steel layer and is incorporated in the composite material 10 with the specifically named steel material disposed adjacent the interfacial surface 20 of the composite material 10.

In accordance with this invention, the laminate layer 18 preferably embodies a selected silicon aluminum alloy having a composition, by weight, of 0.01 percent copper, 0.46 percent iron, 0.01 percent manganese, 0.02 percent titanium, 1.23 percent silicon, and the balance aluminum. However, other silicon aluminum alloys having between 0.7 percent and about 3.0 percent silicon can also be embodied in the laminate layer 18 within the scope of this invention.

In the preferred embodiment of this invention, the laminate layer 32 of the composite material 10 embodies any conventional, commercially available aluminum alloy such as the alloy designated by the U.S. Government as Aluminum Alloy 3003 having a composition, by weight, of from 1.0–1.5 percent manganese, 0.6 percent (maximum) silicon, 0.7 percent (maximum) iron, 0.20 percent (maximum) copper, 0.10 percent (maximum) zinc, 0.05 percent (maximum) of each other element the total of which shall not exceed 0.15 percent, and the balance aluminum. Commercially pure aluminum can also be embodied in the layer 32. It should be understood that the layer 32 can be omitted within the scope of this invention, the entire outer aluminum layer of laminate material 10 being formed of the silicon aluminum alloy above described. As will be understood, the described aluminum layers 18 and 32 of the composite material are higher (more anodic) in the galvanic series of metals and alloys than the described stainless steel materials.

In accordance with the method of this invention, strips of the noted stainless steel, mild steel and aluminum materials are roll-squeezed together with reduction in the thickness of the metal layers for metallurgically bonding the metal layers together. The roll squeezing is preferably performed while the materials are at a temperature below the temperature at which a liquid phase of the strip materials is formed and below the temperature at which aluminum-iron intermetallic compounds are formed. For example, the material layers are preferably bonded together in the manner described in U.S. Pat. 2,691,815 issued the assignee of the present invention on Oct. 19, 1954. That is, for example, a strip of SAE 434 Stainless Steel, a strip of SAE 1006 Capped Steel, a strip of the above described silicon aluminum alloy, and a strip of 3003 Aluminum Alloy are preferably cleaned in the manner described in said U.S. Patent and are then squeezed together at room temperature, or at a temperature slightly above room temperature as developed by the squeezing process, to achieve about 45–75 percent reduction in the thickness of the strip materials, thereby to metallurgically bond the strip materials together in the solid phase. The starting strip materials are preferably in annealed, dead soft condition.

In accordance with this invention, the bonded composite material is then heated to a temperature which is above the recrystallization temperature of the mild steel material or materials in the intermediate laminate layer 16 but which is below the recrystallization temperature of the stainless steel material or materials of the laminate layer 12 and which is below the temperature at which aluminum-iron intermetallic compounds are formed along the laminate interface 20 at any substantial rate. For example, where the SAE 434, SAE 1006, silicon aluminum alloy and 3003 Aluminum materials specifically described above are embodied in the composite material 10, the composite material is heated to a temperature in the range from about 900° F. to about 1,050° F. for sufficient period of time, on the order of 15 minutes to about 6 hours, to substantially anneal the mild steel intermediate layer materials of the composite while leaving the stainless steel layer materials of the laminate in substantially the cold-worked condition resulting from the initial roll-bonding of the laminate and while avoiding formation of any significant quantity of aluminum-iron intermetallic compounds along the laminate interface 20. As will be understood, the uncombined nitrogen content of the mild steel layer 16 bonded to the aluminum layer 18 tends to retard the formation of aluminum-iron intermetallic compounds at the laminate interface 20 so that, where the uncombined nitrogen content of the mild steel materials of the laminate is at the upper end of the range suggested herein, the heat treatment of the bonded composite material can best be performed at the upper range of the temperatures suggested herein. As will also be understood, this heating step does not produce a liquid phase in any of the composite layer materials but tends to sinter the laminate bonds in the manner described in the above noted U.S. Patent for enhancing the strength of the bonds between the laminate layers.

In a preferred embodiment of this invention for use in making automotive trim and the like, the laminate material 10 has a thickness in the range from about 0.015 to 0.063 inch, the stainless steel layer 12 comprising about 15 percent, the mild steel layer 16 comprising about 80 percent, and the aluminum layers 18 and 32 comprising a total of about 5 percent of the total laminate thickness. In this arrangement, the aluminum layer 18 of the laminate preferably has a thickness of at least about 0.002 inch.

In accordance with this invention, the composite material 10 is formed into any desired trim configuration such as is illustrated in FIG. 2 in which the stainless steel layer of the laminate is disposed exteriorly of the trim configuration. That is, for example, as shown in FIG. 2, the laminate material is formed by any conventional method into the C-shaped configuration illustrated at 22. This trim configuration 22 is then secured to an automotive body 24 formed of mild steel and the like by a clip 26 which is also preferably formed of steel, plastic or the like, the body 24 customarily having a painted coating 28 thereon and the clips being secured to the body by means of a steel or plastic rivet 30 or the like as shown in FIG. 2. In this arrangement, the clip 26 has a flat portion 26.1 resting against the painted automotive body, has winged portions 26.2 extending in spaced relation to the body, and has inturned edges 26.3, the ends 22.1 of the trim configuration being fitted behind the clipped wings 26.2 for detachably securing the trim to the automotive body.

In the laminate material 10 provided by this invention, the interface 20 in the laminate is free of any significant aluminum-iron intermetallic compound and the principal layer 16 of the laminate is in annealed condition so that the laminate is easily formed into the described trim configuration as well as other trim configurations. Although the stainless steel layer 12 of the laminate is in cold-worked condition, it is found that this cold-worked layer is readily formed when bonded in the described manner to the annealed mild steel layer of the laminate. Yet the resulting trim configuration has significant advantages in that the cold-worked stainless steel surface layer of the laminate does not tend to be deleteriously affected by the forming operations necessary for making the trim configuration and the stainless steel layer also retains its attractive color and luster. The stainless steel layer of the trim is also highly resistant to abrasion or scratching because of its cold-worked condition. The inner aluminum layer or layers of the laminate are disposed as sacrificial layers to be corroded during use of the trim material in preference to the mild steel materials of the laminate or of the automotive body, thereby protecting these mild steel materials against galvanic corrosion. That is, the aluminum layers of the laminate material being higher (more anodic) in the galvanic series of metals and alloys than the mild steel materials of the laminate, any galvanic corrosion occurring in the area of the trim configuration preferentially corrodes the aluminum materials of the trim configuration. The aluminum layers of the laminate are very thin so that corrosion thereof does not significantly alter the fit of the trim configuration on the clip 26.

Although particular embodiments of the laminate materials, trims and methods of this invention have been described by way of illustration, it should be understood that this invention includes all modifications and equivalents thereof which fall within the scope of the appended claims.

I claim:

1. A method for making a composite metal laminate material comprising disposing a strip of mild steel material between a strip of stainless steel material and a strip of aluminum material to engage interfacial surfaces of said strips, said interfacial surfaces of said strips being clean and free of bond-deterring contaminants, roll-squeezing said strips together with reduction in the thicknesses thereof at a temperature below the temperature at which a liquid phase of said strip materials is formed and below a temperature at which aluminum-iron intermetallic compounds are formed between the strip materials for bonding said strip means together to form a composite material and for cold-working said stainless steel material, and heating said composite material to a temperature which is above the recrystallization temperature of said mild steel material and which is below the recrystallization temperature of said stainless steel material and below the temperature at which aluminum-iron intermetallic compounds are formed at the interface between said mild steel and aluminum materials to recrystallize said mild steel while retaining said stainless steel material in cold-worked condition.

2. A method as set in claim 1 wherein said strip of mild steel material is of sufficient thickness to form about 80 percent of the total thickness of said composite material.

3. A method as set forth in claim 1 wherein said strip of mild steel material includes a layer of mild steel material having a composition, by weight, of 0.08 percent maximum) carbon, 0.25–0.40 percent manganese, 0.040 percent (maximum) phosphorous, 0.050 percent (maximum) silicon, about 0.015 percent (maximum) aluminum, about 0.04 percent (maximum) copper, not more than about 0.39 percent of other ingredients present as impurities, and the balance iron, and wherein said strip of aluminum material includes a layer of silicon aluminum alloy having a composition, by weight, of 0.01 percent copper, 0.46 percent iron, 0.01 percent manganese, 0.02 percent titanium, 1.23 percent silicon, and the balance aluminum, said strip of mild steel material and said strip of aluminum material being disposed to engage an interfacial surface of said layer of said mild steel material with an interfacial surface of said layer of silicon aluminum alloy and being rolled-squeezed for metallurgically bonding said layer of mild steel material to said layer of silicon aluminum alloy along said interfacial surfaces of said layers.

4. A method for making a composite metal laminate material comprising the steps of providing a strip of mild steel material having a composition, by weight, of 0.08 percent (maximum) carbon, 0.25–0.40 percent manganese, 0.040 percent (maximum) phosphorous, 0.050 percent (maximum) silicon, about 0.015 percent (maximum) aluminum, about 0.04 percent (maximum) copper, not more than about 0.39 percent of other ingredients present as impurities, and the balance iron, providing a strip of stainless steel material having a composition, by weight, of from 0.10–0.14 percent carbon, from 14.0–18.0 percent chrominum, and the balance iron, providing a strip of silicon aluminum alloy having a composition, by weight, of 0.01 percent copper, 0.46 percent iron, 0.01 percent manganese, 0.02 percent titanium, 1.23 percent silicon, and the balance aluminum, providing a strip of another aluminum material having a composition, by weight, of from 1.0–1.5 percent manganese, 0.6 percent (maximum) silicon, 0.7 percent (maximum) iron, 0.20 percent (maximum) copper, 0.10 percent (maximum) zinc, 0.05 percent (maximum) of each other element the total of which will not exceed 0.15 percent, and the balance aluminum, disposing said strip of mild steel material between said strip of stainless steel and said strip of silicon aluminum alloy to engage interfacial surfaces of said strips, and disposing said strip of other aluminum material to engage an opposite interfacial surface of said layer of silicon aluminum alloy, said interfacial surfaces of said strips being clean and free of bond-deterring contaminants, roll-squeezing said strips together with reduction in the thicknesses thereof at a temperature below the temperature at which a liquid phase of said strip material is formed and below a temperature at which aluminum-iron intermetallic compounds are formed between said mild steel and silicon aluminum alloy strip materials for bonding said strips together to form a composite material and for cold-working said stainless steel material, and heating said composite material to a temperature in the range from 900° to 1,050° F. to recrystallize said mild steel material while retaining said stainless steel material in cold-worked condition and while retaining said interfacial surface between said mild steel and silicon aluminum alloy materials substantially free of aluminum-iron intermetallic compounds.

* * * * *